(12) United States Patent
Shimoda

(10) Patent No.: US 11,327,893 B2
(45) Date of Patent: May 10, 2022

(54) ELECTRONIC DEVICE AND MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masashi Shimoda, Abiko Chiba (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/198,042

(22) Filed: Mar. 10, 2021

(65) Prior Publication Data

US 2022/0075728 A1 Mar. 10, 2022

(30) Foreign Application Priority Data

Sep. 4, 2020 (JP) .............................. JP2020-148935

(51) Int. Cl.
*G06F 12/0866* (2016.01)
*G06F 13/42* (2006.01)

(52) U.S. Cl.
CPC ...... *G06F 12/0866* (2013.01); *G06F 13/4221* (2013.01); *G06F 2212/1024* (2013.01); *G06F 2212/21* (2013.01); *G06F 2212/452* (2013.01); *G06F 2213/0028* (2013.01)

(58) Field of Classification Search
CPC .................................................. G06F 12/0866
USPC ......................................................... 711/112
See application file for complete search history.

(56) References Cited

U.S. PATENT DOCUMENTS

| | | | |
|---|---|---|---|
| 9,047,068 B2 | 6/2015 | Pereira | |
| 10,042,585 B2 | 8/2018 | Erickson et al. | |
| 10,901,923 B1 | 1/2021 | Yamamoto et al. | |
| 2003/0145133 A1* | 7/2003 | Pelly | G06F 13/4226 710/1 |
| 2008/0165007 A1* | 7/2008 | Drago | G06K 7/10435 340/572.1 |
| 2013/0110308 A1 | 5/2013 | Pereira | |
| 2015/0067235 A1 | 3/2015 | Myouga | |
| 2018/0088860 A1 | 3/2018 | Erickson et al. | |

FOREIGN PATENT DOCUMENTS

| | | |
|---|---|---|
| JP | 2019-166454 A | 10/2019 |
| JP | 2021-043801 A | 3/2021 |

\* cited by examiner

*Primary Examiner* — Jae U Yu
(74) *Attorney, Agent, or Firm* — Kim & Stewart LLP

(57) ABSTRACT

According to one embodiment, an electronic device includes an interface configured to carry out communication according to a predetermined protocol, and a control section configured to add a response frame to a response to a command to be received through the interface, and transmit the response to which the response frame is added through the interface. The control section includes a setting section configured to set an arbitrarily settable field included in the response frame to a plurality of sections.

9 Claims, 7 Drawing Sheets

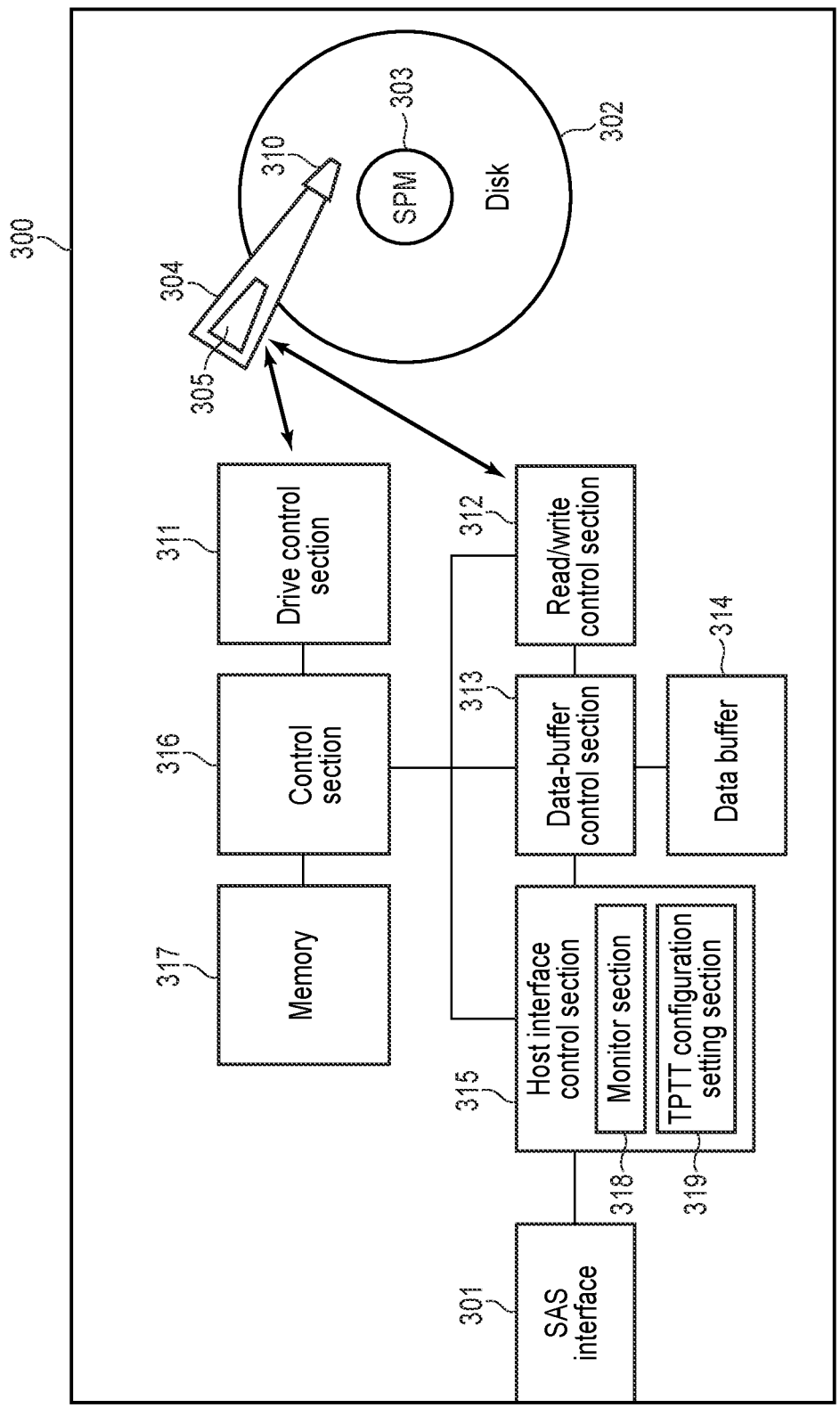
F I G. 3

T10

| Byte | 7 | 6 | 5 | 4 | 3 | 2 | 1 | 0 |
|---|---|---|---|---|---|---|---|---|
| 0 | FRAME TYPE ||||||||
| 1-3 | HASHED DESTINATION SAS ADDRESS ||||||||
| 4 | RESERVED ||||||||
| 5-7 | HASHED SOURCE SAS ADDRESS ||||||||
| 8-9 | RESERVED ||||||||
| 10 | RESERVED ||| TLR CONTROL || RETRY | RETRANSMIT | CHANGING DATA POINTER |
| 11 | RESERVED |||||| No of FILL BYTES ||
| 12-15 | RESERVED ||||||||
| 16-17 | INITIATOR PORT TRANSFER TAG ||||||||
| 18-19 | TARGET PORT TRANSFER TAG ||||||||
| 20-23 | DATA OFFSET ||||||||
| 24-m | INFORMATION UNIT ||||||||
| m-(n-3) | Fill bytes, if needed ||||||||
| (n-3)-n | CRC ||||||||

ELECTRONIC DEVICE AND MAGNETIC DISK DEVICE

CROSS-REFERENCE TO RELATED APPLICATIONS

This application is based upon and claims the benefit of priority from Japanese Patent Application No. 2020-148935, filed Sep. 4, 2020, the entire contents of which are incorporated herein by reference.

FIELD

Embodiments described herein relate generally to an electronic device and magnetic disk device.

BACKGROUND

When an electronic device or the like is connected to a host through an interface, a technique in which the electronic device or the like notifies the host of a state thereof at predetermined timing, whereby the host monitors the state of the electronic device or the like is known.

Embodiments described herein aim to provide an electronic device and magnetic disk device in which a monitor function is improved.

BRIEF DESCRIPTION OF THE DRAWINGS

FIG. 3 is a view showing an example of the schematic configuration of a magnetic disk device according to the first embodiment.

FIG. 4 is a view showing an example of an SSP frame according to the first embodiment.

DETAILED DESCRIPTION

Figure 1:
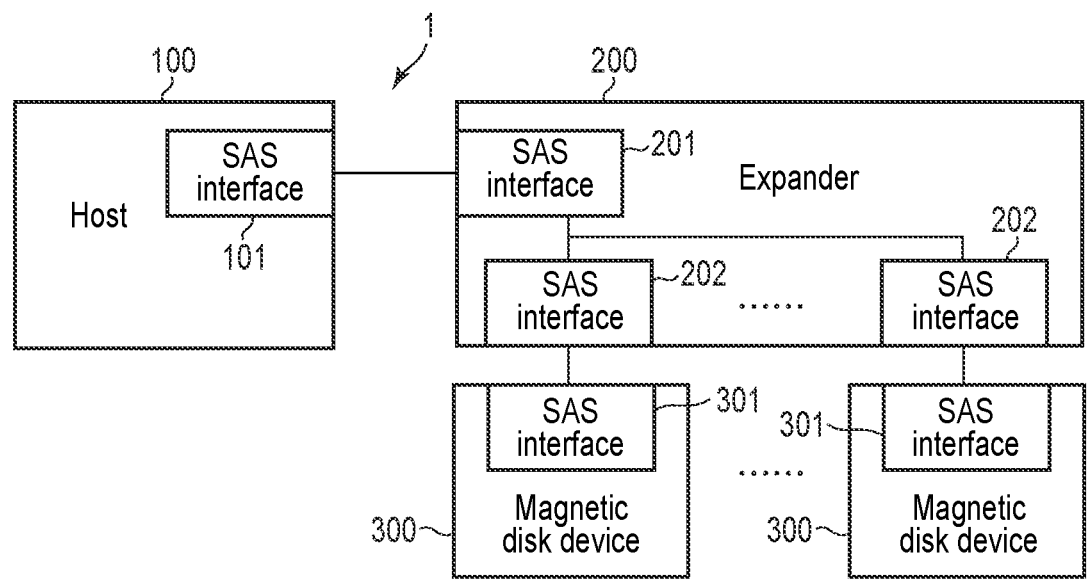
FIG. 1 is a view showing an example of the electronic device system configuration according to a first embodiment.

In general, according to one embodiment, an electronic device comprises an interface configured to carry out communication according to a predetermined protocol; and a control section configured to add a response frame to a response to a command to be received through the interface, and transmit the response to which the response frame is added through the interface. The control section includes a setting section configured to set an arbitrarily settable field included in the response frame to a plurality of sections.

Various embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

FIG. 1 is a view showing an example of the configuration of an electronic device system 1 of this embodiment.

As shown in FIG. 1, in the electronic device system 1, a host 100, expander 200, and a plurality of magnetic disk devices (electronic devices) 300 are included. The host 100, expander 200, and plurality of magnetic disk devices 300 are connected to each other through predetermined interfaces. Although in this embodiment, descriptions are given of a case where the predetermined interface is a serial attached SCSI (SAS) interface, the interface is not limited to this. Further, although in this embodiment, the host 100 is described about a case where the host 100 is connected to each of the magnetic disk devices 300 through the expander 200, the host 100 may also be directly connected to the magnetic disk devices 300.

The host 100 includes an SAS interface 101, expander 200 includes SAS interfaces 201 and 202, and each magnetic disk device 300 includes an SAS interface 301. The host 100 and expander 200 are connected to each other through the SAS interface 101 and SAS interface 201. The expander 200 and each of the plurality of magnetic disk devices 300 are connected to each other through the SAS interface 202 and SAS interface 301. It should be noted that one of the SAS interfaces 202 of the expander 200 may also be connected to another expander 200. As described above, the host 100 is connected to the magnetic disk devices 300 through the SAS interfaces by way of the expander 200, and hence is configured to be able to carry out data communication conforming to the communication standard serial SCSI protocol (SSP).

Figure 2:
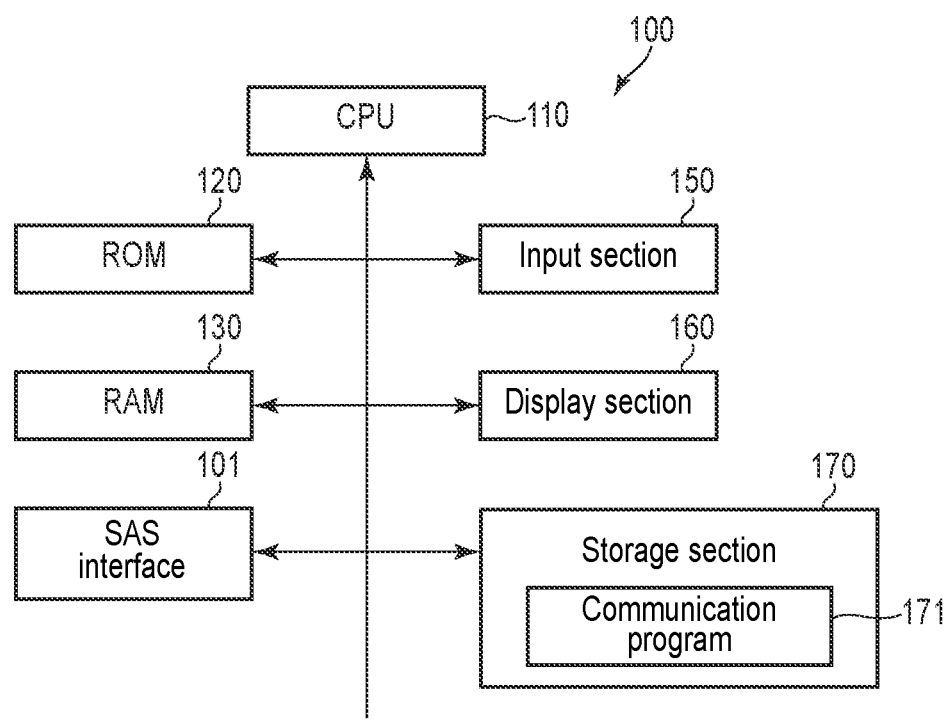
FIG. 2 is a view showing an example of the schematic configuration of a host according to the first embodiment.

FIG. 2 is a view showing an example of the schematic configuration of the host 100.

The host 100 is, for example, an information processing device such as a computer device, and manages the plurality of magnetic disk devices 300. As shown in FIG. 2, the host includes a CPU 110, ROM 120, RAM 130, SAS interface 101, input section 150, display section 160, and storage (memory) section 170. The CPU 110 is connected to each of the ROM 120, RAM 130, SAS interface 101, input section 150, display section 160, and storage section 170. Further, the storage section 170 includes a communication program 171.

The CPU 110 is a central processing device and executes the program stored in the storage section 170 by using the ROM 120, RAM 130, and the like. The ROM 120 is a nonvolatile memory, and stores therein a program and the like to be used as a base for operating the host 100. The RAM 130 is for example, a DRAM and is used as a work area or like at the time when the CPU 110 executes the program. The SAS interface 101 connects with the SAS interface 201 of the expander 200. The input section 150 is, for example, a keyboard or mouse, is operated by the user using the host 100, and instructions are input to the host 100 by the input section 150. The display section 160 is, for example, a display, and displays information toward the user.

The storage section 170 is, for example, a hard disk drive, and stores therein various programs and data. The communication program 171 is a program configured to, when a command is transmitted to the magnetic disk device 300 connected to the host 100, monitor in what state the command is processed in the magnetic disk device 300. In this embodiment, when a command is transmitted to the magnetic disk device 300 by using the SAS interface 101, how the command is processed in the magnetic disk device 300 is monitored on the basis of information stored in the TPTT of the response frame added to a response transmitted from the magnetic disk device 300 as a result of the response to the command. The TPTT will be described later.

The expander 200 is an intermediary device configured to relay information between the host 100 and magnetic disk device 300. The expander 200 includes the SAS interfaces 201 and 202. The SAS interface 201 is connected to the host 100, and SAS interfaces 202 are respectively connected to the plurality of magnetic disk devices 300. Thereby, a command issued from the host 100 is transmitted to the designated magnetic disk device 300 through the expander 200, and a response corresponding to the command is transmitted from the magnetic disk device 300 to the host 100 through the expander 200.

FIG. 3 is a view showing an example of the schematic configuration of the magnetic disk device 300.

As shown in FIG. 3, the magnetic disk device 300 is, for example, a hard disk drive (HDD). The magnetic disk device 300 is provided with a magnetic disk 302, spindle motor (SPM) 303, actuator 304, voice coil motor (VCM) 305, magnetic head 310, drive control section 311, read/write control section 312, data-buffer control section 313, data buffer 314, host interface control section 315, control section 316, memory 317, and SAS interface 301. The magnetic disk device 300 is connectable to the expander 200 through the SAS interface 301. It should be noted that the read/write control section 312, host interface control section 315, and control section 316 may also be incorporated into a one-chip integrated circuit. Further, the magnetic disk 302, SPM 303, actuator 304, VCM 305, magnetic head 310, and the like are provided in a predetermined airtight housing.

The magnetic head 310 is provided with a write head (recording head: writer), read head (reproducing head: reader), and spin-torque-oscillator (STO) which is a high-frequency oscillation element. The magnetic heads 310 are provided in a plural number according to the number of the magnetic disks 302.

The magnetic disk 302 includes a substrate formed into, for example, a disk-like shape and constituted of a nonmagnetic substance. In each surface of the substrate, a soft magnetic layer constituted of a material exhibiting soft magnetic characteristics and functioning as a foundation layer, magnetic recording layer having magnetic anisotropy in a direction perpendicular to the disk surface to be formed on the soft magnetic layer, and protective film layer to be formed on the magnetic recording layer are stacked one on top of the other in the order mentioned.

The magnetic disk 302 is fixed to the spindle motor (SPM) 303 and is rotated by the SPM 303 at a predetermined rotational speed. It should be noted that the number of the magnetic disk 302 is not limited one, and a plurality of magnetic disks 302 may be provided on the SPM 303. The SPM 303 is driven by a drive current (or drive voltage) to be supplied thereto from the drive control section 311. A data pattern is recorded/reproduced on/from the magnetic disk 302 by the magnetic head 310.

The actuator 304 is rotatably provided and the magnetic head 310 is supported on the tip section thereof. By rotating the actuator 304 by means of the voice coil motor (VCM) 305, the magnetic head 310 is moved to a position on a desired track of the magnetic disk 302 and is positioned there. The VCM 305 is driven by a drive current (or drive voltage) to be supplied thereto from the drive control section 311.

The read/write control section 312 includes a signal processing circuit configured to process a signal relating to read/write. The signal processing circuit is provided with a read channel configured to execute signal processing of read data and write channel configured to execute signal processing of write data. The read/write control section 312 amplifies a read signal output from the magnetic head (read head) 310, converts the read signal into digital data, decodes read data from the digital data, and transfers the read data to the data-buffer control section 313. Further, the read/write control section 312 encodes write data transferred thereto from the data-buffer control section 313, and supplies a write signal (write current) corresponding to the encoded write data to the magnetic head (write head) 310.

The data-buffer control section 313 temporarily holds read data transferred thereto from the read/write control section 312 in the data buffer 314 and thereafter transfers the read data to the host interface control section 315. Further, the data-buffer control section 313 temporarily holds write data transferred thereto from the host interface control section 315 in the data buffer 314 and thereafter transfers the write data to the read/write control section 312.

The host interface control section 315 receives a command (write command, read command, and the like) transferred thereto from the host 100 on the basis of the control of the control section 316, and transmits the received command to the control section 316. Further, the host interface control section 315 transmits a processing result of the command to the host 100 on the basis of the control of the control section 316. In this embodiment, the host interface control section 315 includes a monitor section 318 and TPTT configuration setting section 319. Details of descriptions of the monitor section 318 and TPTT configuration setting section 319 will be given later.

The control section 316 is a main controller of the magnetic disk device 300, and controls write of data to the magnetic disk 302 and read of data from the magnetic disk 302 through the magnetic head 310, read/write control section 312, data-buffer control section 313, and data buffer 314. Further, the control section 316 executes servo control necessary for positioning of the magnetic head 310. Furthermore, upon receipt of a command from the host 100 through the host interface control section 315, the control section 316 executes the command at predetermined timing, and controls the host interface control section 315 to thereby transmit a response based on the SSP frame including an execution result of the command and the like to the host 100.

The drive control section 311 controls drive of the SPM 303 and VCM 305 according to the control of the CPU 316. By driving the VCM 305, the magnetic head 310 is positioned to a target track on the magnetic disk 302.

The memory 317 includes a volatile memory and non-volatile memory. For example, the memory 317 includes a buffer memory constituted of a DRAM and flash memory. The memory 317 stores therein programs and parameters necessary for the processing of the control section 316.

Regarding the communication standard (SSP) for carrying out communication between each of the host 100, expander 200, and magnetic disk devices 300 connected to each other through the SAS interfaces, when a response to a command received from the host 100 is transmitted from the magnetic disk device 300 to the host 100, in the SSP frame to be added to the response, various information items are included.

FIG. 4 is a view showing an example of the SSP frame. The SSP frame is, in the case of, for example, SSP FRAME HEADER FORMAT, defined as SPL-5 Ver07.

As shown in FIG. 4, the SSP frame T10 is constituted of BYTE0 to BYTEn. Further, stipulations are made in such a manner that FRAME TYPE is used to make each frame include therein various information items. In this embodiment, it is made possible for the information indicating the command execution result and the like of the magnetic disk device 300 to be included not in the field of RESERVED included in the SSP frame T10 but in the TARGET PORT TRANSFER TAG (TPTT) field T11 of Bytes 18 and 19. The TPTT field T11 is a field in which it is possible to arbitrarily set in advance what contents are to be stipulated when the FRAME TYPE is a RESPONSE FRAME. It should be noted that hereinafter the TPTT field T11 is simply referred to as the field T11.

Figure 5:
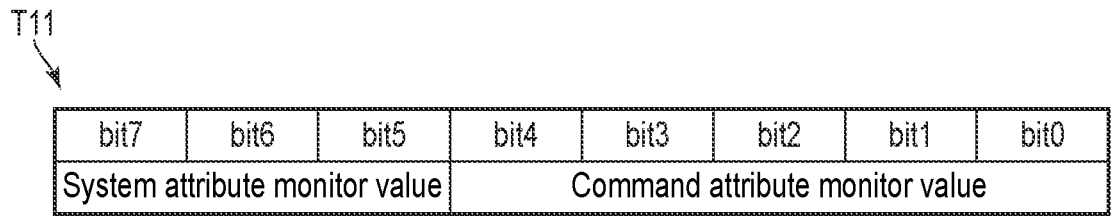
FIG. 5 is a view showing an example of details of a TPTT field according to the first embodiment.

FIG. 5 is a view showing an example of information included in the field T11 in this embodiment. As shown in FIG. 5, an example in which 1 byte of 2 bytes of the field T11 of the SSP frame is used is shown. In FIG. 5, 3 bits of the 1 byte are system attribute monitor values, and 5 bits are command attribute monitor values. In the command attribute TPTT buffer, the command attribute monitor value is stored as the contents of the command attribute and, in the system attribute TPTT buffer, the system attribute monitor value is stored as the contents of the system attribute. Here, the command attribute monitor value is a value dependent on the command and is a value corresponding to, for example, processing contents or the like of a write command or read command. Further, the system attribute monitor value is a value independent of the command and is a value corresponding to, for example, the processing or state of the magnetic disk device common to the system, for example, presence/absence of a maintenance operation or the temperature of the magnetic disk device at the time of command processing. It should be noted that in this embodiment, as shown in FIG. 5, as the types of classification, there are two types including the command attribute and system attribute and, although the sizes of the types are described about a case where the size of the command attribute is 5 bits and size of the system attribute is 3 bits, the type of classification and size of classification can arbitrarily be set within the range of the size (2 bytes) of the field T11.

Figure 6:
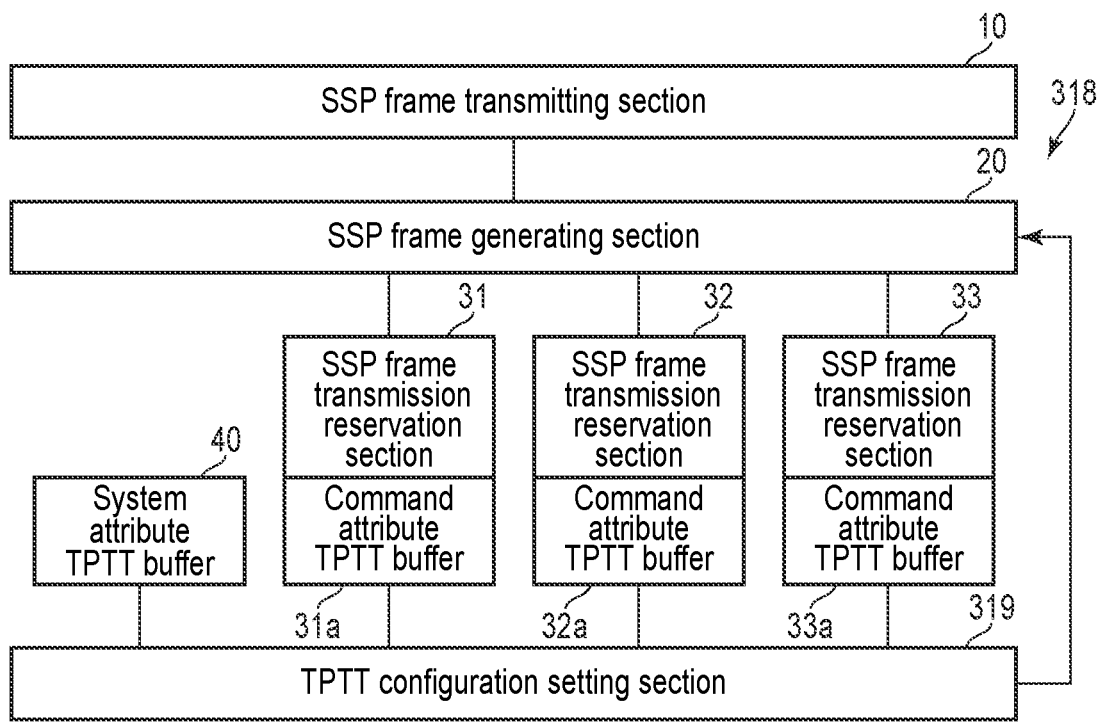
FIG. 6 is a view showing an example of a functional block according to the first embodiment.

FIG. 6 is a view showing an example of a functional block of the monitor section 318.

As shown in FIG. 6, the monitor section 318 includes an SSP frame transmitting section 10, SSP frame generating section 20, SSP frame transmission reservation sections 31, 32, and 33, and system attribute TPTT buffer 40. Further, the SSP frame transmission reservation sections 31, 32, and 33 respectively include command attribute TPTT buffers (first buffers) 31a, 32a, and 33a. The SSP frame transmission reservation sections 31, 32, and 33 are respectively connected to the SSP frame generating section 20 and TPTT configuration setting section 319. Furthermore, the system attribute TPTT buffer (second buffer) 40 is connected to the TPTT configuration setting section 319. In this embodiment, for the sake of convenience of explanation, although descriptions are given of a case where the three SSP frame transmission reservation sections 31, 32, and 33 are provided, the case is not limited to this, and the number of the SSP frame transmission reservation sections may also be two or four or more. Further, although the SSP frame transmitting section 10, SSP frame generating section 20, and SSP frame transmission reservation sections 31, 32, and 33 are described about a case where these sections are configured as the hardware in the host interface control section 315, the case is not limited to this and, for example, the program stored in the memory 317 may also be executed and realized by the CPU in the host interface control section 315 on the basis of an instruction of the control section 316. Furthermore, although the command attribute TPTT buffers 31a, 32a, and 33a and system attribute TPTT buffer 40 are described about a case where these buffers are implemented in the host interface control section 315 as registers, the command attribute TPTT buffers 31a, 32a, and 33a and system attribute TPTT buffer 40 may also be defined on the memory 317.

The SSP frame transmitting section 10 transmits the SSP frame generated by the SSP frame generating section 20. There are some types of the SSP frames. The SSP frame generating section 20 generates the SSP frame including the contents stored in the command attribute TPTT buffers 31a, 32a, and 33a respectively included in the SSP frame transmission reservation sections 31, 32, and 33, and contents stored in the system attribute TPTT buffer 40 in the field T11 in the form of a response frame. In this embodiment, hereinafter, descriptions are given of a case where this response frame is transmitted to the host 100. The SSP frame transmission reservation sections 31, 32, and 33 each carry out data transmission/reception and a block reservation of transmission of responses or reservation of response transmission. Each of the command attribute TPTT buffers 31a, 32a, and 33a and system attribute TPTT buffer 40 stores therein data on the basis of the setting of the TPTT configuration setting section 319.

In each of the command attribute TPTT buffers 31a, 32a, and 33a, a command attribute monitor value dependent on the command such as a value corresponding to details or the like about processing of a command is stored, and the command attribute monitor value is a value to be included in the field T11 of the response frame at the time of data transmission/reception, a block reservation for transmission of responses or reservation for response transmission each corresponding to the command. On the other hand, as the system attribute monitor value, a value independent of the command described previously such as temperature information and presence/absence of system common processing is set, and the value is stored in the system attribute TPTT buffer 40 at each necessary acquisition timing irrespective of execution of the command.

Figure 7:
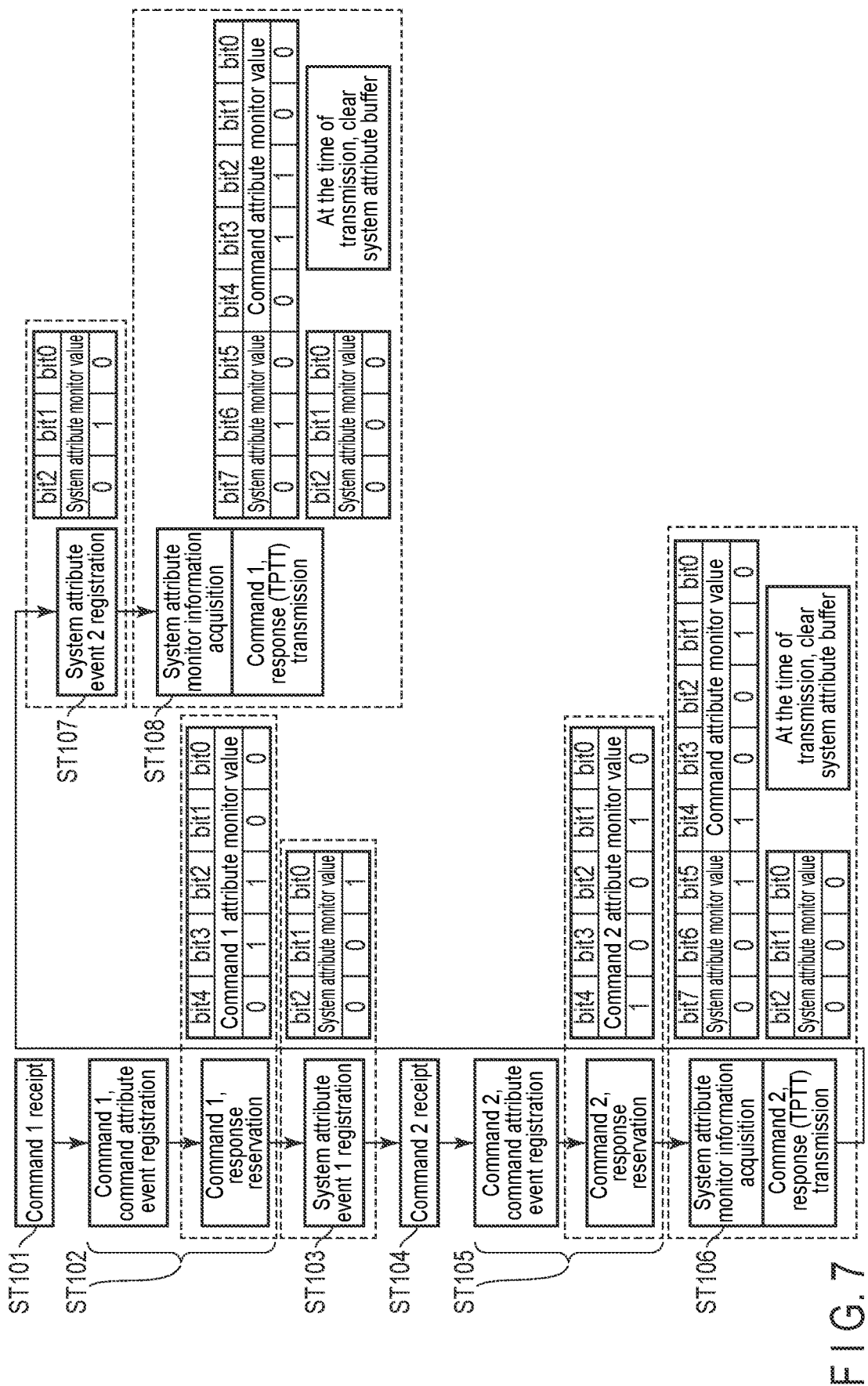
FIG. 7 is a flowchart showing an example of response frame transmission processing according to the first embodiment.

Next, an example of the transmission processing of a response to which a response frame is added will be described below. FIG. 7 is a flowchart showing an example of the response frame transmission processing. In FIG. 7, monitor values to be set to the command attribute TPTT buffers 31a, 32a, and 33a and monitor value to be set to the system attribute TPTT buffer 40 in the case where two commands (command 1 and command 2) and two system attribute events (event 1 and event 2) occur are shown. It should be noted that descriptions of the SSP frame relating to the other command and data transmitted during this processing and contents stored in the field T11 (TPTT) in the SSP frame are omitted in this embodiment.

Upon receipt of a command 1 from the host 100 through the host interface control section 315 (ST101), the control section 316 registers a command 1 attribute event according to the contents of the processing of the command 1 to be carried out. Then, after completing the necessary processing, the control section 316 makes a reservation for the transmission corresponding to the command 1 at the SSP frame transmission reservation section 31 of the host interface control section 315. Then, the host interface control section 315 registers a command 1 attribute monitor value based on the command 1 attribute event to be determined in the process of the processing of the command 1 in the command attribute TPTT buffer 31a on the basis of the control of the control section 316. In this embodiment, as the command 1 attribute monitor value, "01100" is registered in the command attribute TPTT buffer 31a (ST102). Accordingly, this monitor value "01100" becomes part of the contents of the field T11 of the response frame to be added to the response to the command 1.

Next, it is assumed that a system attribute event 1 has occurred. It is assumed that the event attribute monitor value of this system attribute event 1 is "001". Then, the control section 316 controls the host interface control section 315 to thereby register the event attribute monitor value "001" in the system attribute TPTT buffer 40 of the host interface control section 315 (ST103).

Next, upon receipt of a command 2 from the host 100 through the host interface control section 315 (ST104), the control section 316 registers a command 2 attribute event according to the contents of the processing of the command 2 to be carried out. Next, after completing the necessary processing, the control section 316 makes a reservation for the transmission corresponding to the command 2 at the SSP frame transmission reservation section 32 of the host interface control section 315. That is, the host interface control section 315 registers the command 2 attribute monitor value to be determined in the process of the processing of this command 2 in the command attribute TPTT buffer 32a on the basis of the control of the control section 316. In this embodiment, as the command 2 attribute monitor value, "10010" is registered in the command attribute TPTT buffer 32a (ST105). Accordingly, this monitor value "10010" becomes part of the contents of the field T11 of the response frame to be added to the response to the command 2.

Here, when the processing of the command 2 the reservation for which is already finished at the host interface control section 315 is completed earlier than the processing of the command 1, the response frame corresponding to the command 2 is generated earlier than the response frame corresponding to the command 1 by the host interface control section 315. At this time, the command attribute monitor value for the command 2 and system attribute monitor value therefor are combined with each other and the value of the field T11 is thereby generated. More specifically, the SSP frame generating section 20 combines the command 2 attribute monitor value "10010" registered in the command attribute TPTT buffer 32a and event attribute monitor value "001" registered in the system attribute TPTT buffer 40 with each other on the basis of the contents of the TPTT configuration setting section 319.

The SSP frame transmitting section 10 transmits the response frame including the value "00110010" generated by the combination in this manner in the field T11 (ST106). As a result, because the SSP frame transmitting section 10 is under the command of the host interface control section 315, the response frame in which "00110010" is included in the field T11 is transmitted to the host 100 as the SSP frame.

Further, at the time of the transmission, the system attribute TPTT buffer 40 is cleared, and the SSP frame transmission reservation section 32 and command attribute TPTT buffer 32a are cleared.

Next, it is assumed that a system attribute event 2 has occurred. It is assumed that the event attribute monitor value of this system attribute event 2 is "010". Then, the host interface control section 315 registers the event attribute monitor value "010" in the system attribute TPTT buffer 40 on the basis of the control of the control section 316 through the registration of the system attribute event carried out by the control section 316 (ST107).

Then, when the processing of the command 1 the reservation for which is already finished at the host interface control section 315 is completed, the host interface control section combines the command attribute monitor value "01100" corresponding to the command 1 and system attribute monitor value "010" with each other, and the SSP frame transmitting section 10 transmits the response frame including the value "01001100" generated by the combination in this manner in the field T11 as in the case of the processing of step ST106 (ST108). Further, at the time of the transmission, the system attribute TPTT buffer 40 is cleared, and the SSP frame transmission reservation section 31 and command attribute TPTT buffer 31a are cleared.

As described above, in the magnetic disk device 300, the area of the field T11 of the response frame for the command received from the host 100 can be divided into a plurality of sections, i.e., into the two sections of the command attribute TPTT buffers 31a, 32a, and 33a, and system attribute TPTT buffer 40. For this reason, even when the order of reservations at the SSP frame transmission reservation sections 31, 32, and 33 and the order in which responses are actually transmitted to the host 10 are interchanged with each other, it is possible to output the system attribute monitor values (contents of system attribute) in chronological order. Thereby, it is possible to enhance the monitor function of the magnetic disk device 300.

Second Embodiment

A second embodiment differs from the above-described first embodiment in that the second embodiment is configured in such a manner that the system attribute monitor value and command attribute monitor value are automatically merged with each other. Accordingly, hereinafter the configuration and processing in which both the monitor values are automatically merged with each other will be described in detail. It should be noted that configurations identical to the first embodiment are denoted by reference symbols identical to the first embodiment, whereby descriptions of the configurations are given.

Figure 8:
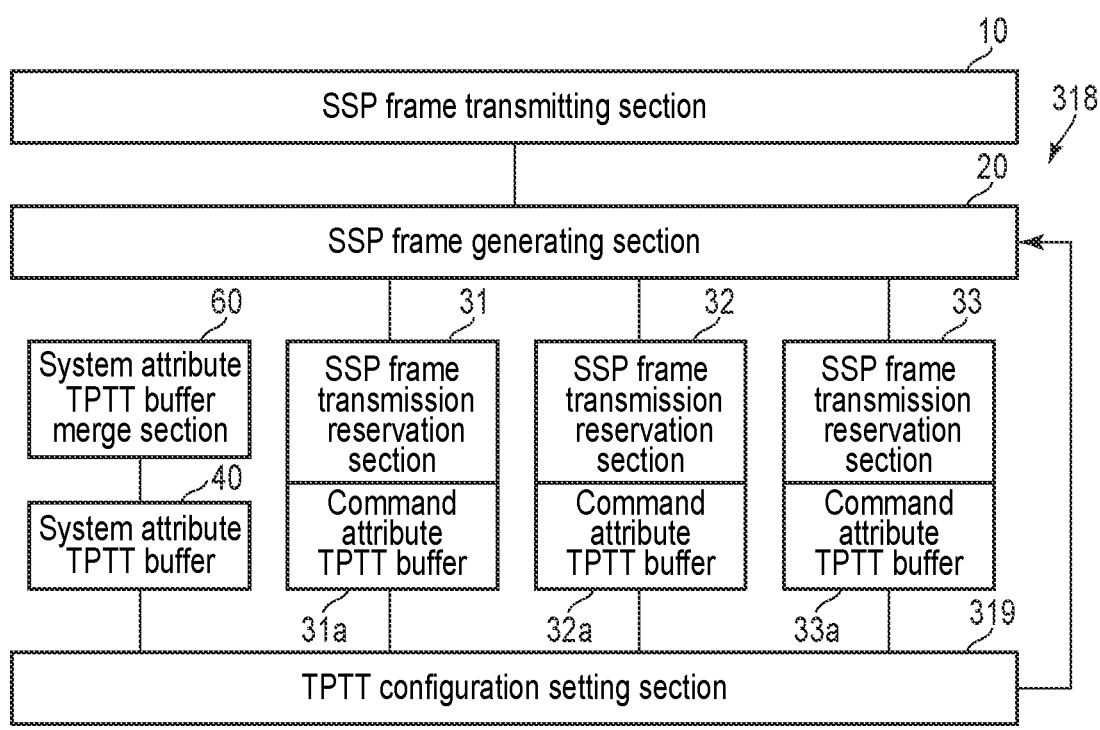
FIG. 8 is a view showing an example of a functional block according to a second embodiment.

FIG. 8 is a view showing an example of a functional block of a monitor section 318.

In comparison with the functional block shown in already-described FIG. 6, a system attribute TPTT buffer merge section 60 is additionally provided. The system attribute TPTT buffer merge section 60 is a processing section configured to, in the registration of the system attribute event, automatically merge the already-registered value and value of the system attribute event to be newly registered with each other to thereby update the system attribute TPTT buffer 40 as a value of the new system attribute event. In this embodiment, the SSP frame generating section 20 merges the value of the system attribute TPTT buffer 40 which is a merged result of the system attribute TPTT buffer merge section 60 and values of the command attribute TPTT buffers 31*a*, 32*a*, and 33*a* with each other on the basis of the TPTT configuration setting section 319 to thereby incorporate the merged resultant into the field T11.

Figure 9:
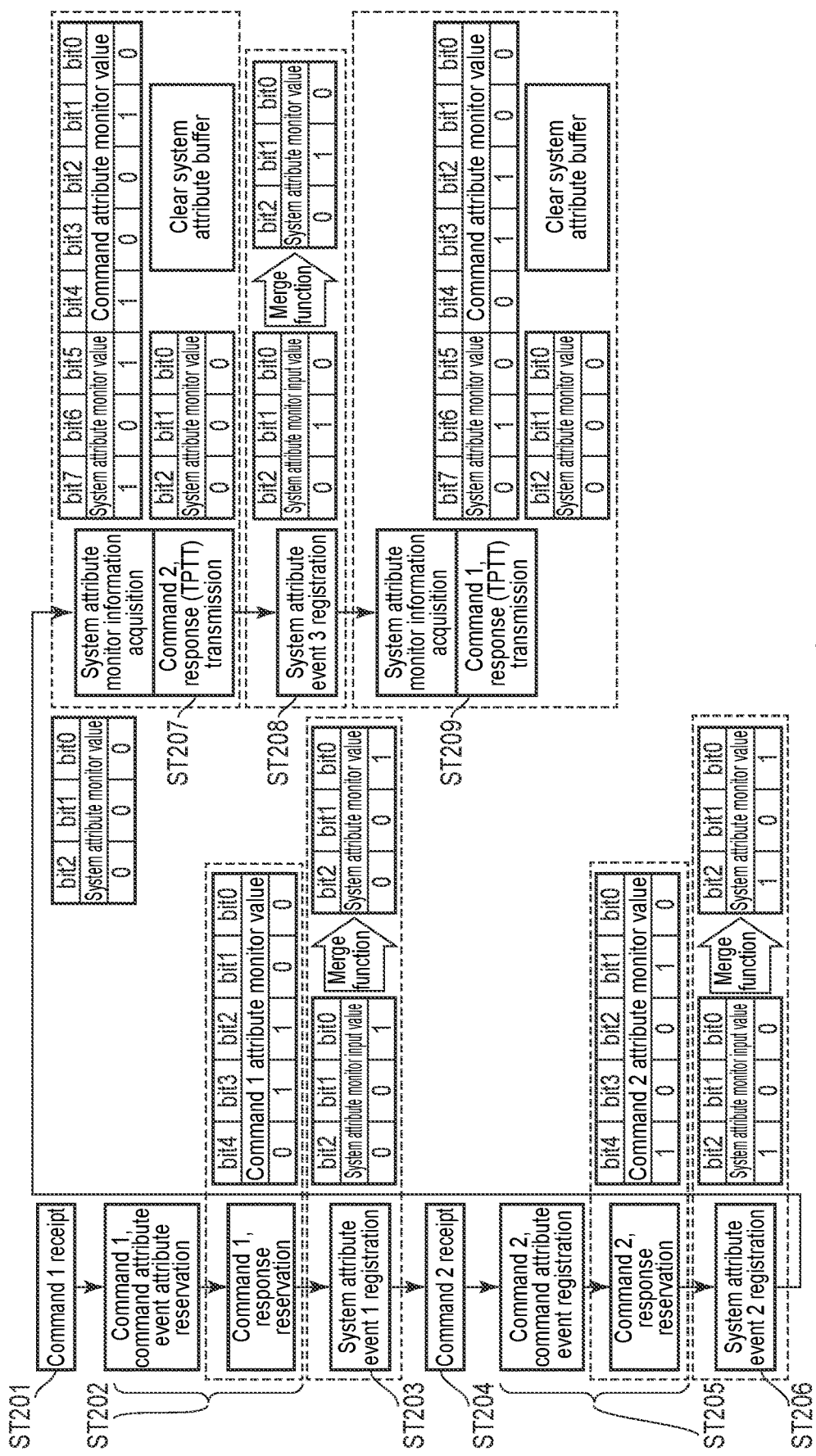
FIG. 9 is a flowchart showing an example of response frame transmission processing according to the second embodiment.

Next, an example of the processing up to the response frame transmission will be described below. FIG. 9 is a flowchart showing an example of the response frame transmission processing. In FIG. 9, monitor values set to the command attribute TPTT buffers 31*a*, 32*a*, and 33*a* and monitor value set to the system attribute TPTT buffer 40 in the case where two commands (command 1 and command 2) and three system attribute events (event 1, event 2, and event 3) have occurred are shown. It should be noted that descriptions of the SSP frame relating to the other command and data transmitted during this processing and contents stored in the field T11 (TPTT) in the SSP frame are omitted in this embodiment.

As shown in FIG. 9, upon receipt of a command 1 from the host 100 through the host interface control section 315 in a state where the system attribute TPTT buffer 40 is cleared and a system attribute monitor value "000" is set thereto (ST201), the control section 316 registers a command 1 attribute event. Then, after completing the necessary processing, the control section 316 registers a transmission reservation corresponding to the command 1 in the SSP frame transmission reservation section 31 of the host interface control section 315. Then, the host interface control section 315 registers a command 1 attribute monitor value to be determined in the process of the processing of the command 1 in the command attribute TPTT buffer 31*a* on the basis of the control of the control section 316. In this embodiment, as the command 1 attribute monitor value, "01100" is registered (ST202).

Next, it is assumed that a system attribute event 1 has occurred. It is assumed that the event attribute monitor value of this system attribute event 1 is "001". Then, the control section 316 controls the host interface control section 315 to thereby register the event attribute monitor value "001" in the system attribute TPTT buffer 40 of the host interface control section 315 (ST203). Thereby, the system attribute monitor value "001" is registered in the system attribute TPTT buffer 40.

Next, upon receipt of a command 2 from the host 100 through the host interface control section 315 (ST204), the control section 316 registers a command 2 attribute event according to the contents of the processing of the command 2 to be carried out. Next, after completing the necessary processing, the control section 316 makes a reservation for the transmission corresponding to the command 2 at the SSP frame transmission reservation section 32 of the host interface control section 315. That is, the host interface control section 315 registers the command 2 attribute monitor value to be determined in the process of the processing of this command 2 in the command attribute TPTT buffer 32*a* on the basis of the control of the control section 316. In this embodiment, as the command 2 attribute monitor value, "10010" is registered in the command attribute TPTT buffer 32*a* (ST205).

Next, it is assumed that a system attribute event 2 has occurred. Then, the control section 316 controls the host interface control section 315 to thereby register the event attribute monitor value "100" in the system attribute TPTT buffer 40 of the host interface control section 315 (ST206). At this time, the system attribute TPTT buffer merge section 60 merges the event attribute monitor value "100" corresponding to the system attribute event 2 with the system attribute monitor value "001" of the last time on the basis of the control of the control section 316 to thereby set the resultant value to the system attribute TPTT buffer 40. Thereby, the system attribute monitor value "101" is registered in the system attribute TPTT buffer 40.

Here, when the processing of the command 2 the reservation for which is already finished at the host interface control section 315 is completed earlier than the processing of the command 1, the response frame corresponding to the command 2 is generated earlier than the response frame corresponding to the command 1 in the host interface control section 315. At this time, the command attribute monitor value and system attribute monitor value both corresponding to the command 2 are combined with each other, whereby the value of the field T11 is generated. More specifically, the SSP frame generating section 20 combines the command 2 attribute monitor value "10010" registered in the command attribute TPTT buffer 32*a* and event attribute monitor value "101" merged by the system attribute TPTT buffer merge section 60 and registered in the system attribute TPTT buffer 40 with each other on the basis of the contents of the TPTT configuration setting section 319. The SSP frame transmitting section 10 transmits the response frame including "10110010" generated by the combination in this manner in the field T11 on the basis of the control of the control section 316 in the same manner as the processing of already-described step ST106 (ST207). Further, at the time of this transmission, the system attribute TPTT buffer 40 is cleared, and SSP frame transmission reservation section 32 and command attribute TPTT buffer 32*a* are cleared.

Next, it is assumed that a system attribute event 3 has occurred. It is assumed that the event attribute monitor value of this system attribute event 3 is "010". Then, the host interface control section 315 registers the event attribute monitor value "010" in the system attribute TPTT buffer 40 on the basis of the control of the control section 316 through the registration of the system attribute event carried out by the control section 316 (ST208). At this time, the system attribute TPTT buffer merge section 60 merges the event attribute monitor value "010" corresponding to the system attribute event 3 with the system attribute monitor value "000" cleared last time on the basis of the control of the control section 316 to thereby set the resultant value to the system attribute TPTT buffer 40. Thereby, the system attribute monitor value "010" is registered in the system attribute TPTT buffer 40.

Here, when the processing of the command 1 the reservation for which is already finished at the host interface control section 315 is completed, the SSP frame corresponding to the command 1 is generated on the basis of the control of the control section 316. At this time, the command attribute monitor value and system attribute monitor value both corresponding to the command 1 are combined with each other, whereby the value of the field T11 is generated. More specifically, the SSP frame generating section 20 combines the command 2 attribute monitor value "01100" registered in the command attribute TPTT buffer 32*a* and event attribute monitor value "010" merged by the system attribute TPTT buffer merge section 60 and registered in the system attribute TPTT buffer 40 with each other on the basis of the contents of the TPTT configuration setting section 319. The SSP frame transmitting section 10 transmits the response frame including the value "01001100" generated by the combination in this manner in the field T11 on the basis of the control of the control section 316 in the same manner as the processing of already-described step ST106 (ST209). Further, at the time of this transmission, the system attribute TPTT buffer 40 is cleared, and SSP frame transmission reservation section 32 and command attribute TPTT buffer 32a are cleared.

As described above, even when a plurality of system attribute events occur, it is possible for the magnetic disk device 300, by means of the system attribute TPTT buffer merge section 60 configured to merge the system attribute monitor value, to output the plurality of system attribute events which have occurred in the magnetic disk device 300 to the host 100 at response-frame transmission intervals in chronological order irrespective of the execution order of the commands together with the command attribute monitor value as the value included in the field T11 of the response frame occurring first.

It should be noted that although in the above-mentioned second embodiment, the case where the merge of the system attribute monitor value is carried out by the system attribute TPTT buffer merge section 60 has been described, the case is not limited to the above. For example, a case where for example, a plurality of monitor values are preserved in chronological order without carrying out merges of the system attribute monitor values and, at the time of transmission of the response frame, these preserved monitor values are taken out in sequence, and are included in the field T11 according to the setting of the TPTT configuration setting section 319 may also be practicable. Further, by providing two configurations each of which is contrived in such a manner that the host interface control section 315 preserves the monitor values in chronological order, it becomes possible for the magnetic disk device 300 to manage monitor values of two systems independent of each other.

Further, although in the above-mentioned embodiment, descriptions have been given of a case where the setting contents of the TPTT configuration setting section 319 use a 3-bit value, the TPTT configuration setting section may also be configured changeable. For example, the contents of the event set to a 3-bit value may also be changed. Regarding such a change in the contents, the contents may be changed at the time of shipment according to the request of the shipping destination or the control section 316 may control the host interface control section 315 on the basis of an instruction from the host 100 to thereby change the setting of the TPTT configuration setting section 319. Further, not only the setting contents of the TPTT configuration setting section 319, but also the number of bits may also be changed within the range of the number of bits (16 bits) included in the field T11. Concomitantly with such a change in the setting contents of the TPTT configuration setting section 319 or separately from such a change, the setting contents of the command attribute TPTT buffers 31a, 32a, and 33a may also be changed.

Furthermore, although in the above-mentioned embodiment, descriptions have been given by taking the magnetic disk device 300 as an example of the electronic device, the example is not limited to this, and it is possible to apply the technique described in the above-mentioned embodiments to an electronic device having the SAS interface, more specifically, an interface making it possible to transmit a response frame including an arbitrarily settable field. In the above-mentioned embodiments, the technique is also applicable to the host 100 and expander 200. Further, the technique is applicable to, for example, a solid state drive (SSD) or the like including an SAS interface.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   an interface configured to carry out communication according to a predetermined protocol; and
   a control section configured to add a response frame to a response to a command to be received through the interface, and transmit the response to which the response frame is added through the interface, wherein
   the control section includes
   a setting section configured to set an arbitrarily settable field included in the response frame to a plurality of sections.

2. The electronic device of claim 1, wherein the control section includes
   a plurality of transmission reservation sections each configured to accept a reservation for transmission of the response to the command,
   a plurality of first buffers respectively correlated with the plurality of transmission reservation sections, and
   a second buffer different from the plurality of first buffers, and
   an attribute dependent on the command is stored in each of the plurality of first buffers, and an attribute independent of the command is stored in the second buffer.

3. The electronic device of claim 2, wherein
   upon completion of processing of the command for which a reservation is already made at a transmission reservation section,
   the control section generates the contents to be stored in the field on the basis of the contents stored in a first buffer correlated with the transmission reservation section at which the reservation for the command is already made and the contents stored in the second buffer, and transmits a response to which a response frame including the generated contents is added to a host.

4. The electronic device of claim 3, wherein
   the control section includes a merge section configured to, when an event to store the contents of the attribute independent of the command in the second buffer occurs, merge the contents of the occurred attribute with the contents of the attribute stored in the second buffer, and
   the contents stored in the second buffer when the contents to be stored in the field are generated are the contents merged by the merge section during the period from the time when the contents to be stored in the field are generated last time to the time when the contents to be stored in the field are generated this time.

5. The electronic device of claim 3, wherein
   when the response is transmitted to the host, the first buffer correlated with the transmission reservation section at which the reservation for the command is already made and the second buffer are cleared.

6. The electronic device of claim 1, wherein
   setting of the plurality of sections is configured in such a manner that the types of the sections and the number of bits of each of the sections are changeable.

7. The electronic device of claim 6, wherein
setting of the sections is changed on the basis of an instruction of a host.

8. The electronic device of claim 1, wherein
the interface is a serial attached SCSI (SAS) interface, and
the response frame is a serial SCSI protocol frame.

9. A magnetic disk device comprising:
a magnetic disk;
a magnetic head section configured to carry out read/write from/to the magnetic disk;
an interface configured to carry out communication according to a predetermined protocol; and
a control section configured to control the magnetic head section according to a command to be received through the interface, add a response frame to a response to the command, and transmit the response to which the response frame is added through the interface, wherein
the control section includes
a setting section configured to set an arbitrarily settable field included in the response frame to a plurality of sections.

* * * * *